United States Patent [19]

Shilo

[11] Patent Number: 5,321,575

[45] Date of Patent: Jun. 14, 1994

[54] POWER LINE TRANSIENT SUPPRESSION CIRCUIT

[75] Inventor: Marcel Shilo, Framingham, Mass.

[73] Assignee: Digital Equipment Corporation, Maynard, Mass.

[21] Appl. No.: 101,084

[22] Filed: Aug. 2, 1993

Related U.S. Application Data

[63] Continuation of Ser. No. 716,420, Jun. 17, 1991, abandoned.

[51] Int. Cl.⁵ ............................................. H02H 9/04
[52] U.S. Cl. .................................... 361/56; 361/111; 361/120; 361/127
[58] Field of Search .................. 361/56, 111, 91, 120, 361/127, 128

[56] References Cited

U.S. PATENT DOCUMENTS

| | | | |
|---|---|---|---|
| 4,060,842 | 11/1977 | Allen | 361/56 |
| 4,698,721 | 10/1987 | Warren | 361/111 |
| 4,912,589 | 3/1990 | Stolarczyk | 361/56 |

*Primary Examiner*—Todd DeBoer
*Attorney, Agent, or Firm*—Richard J. Paciulan; Denis G. Maloney

[57] ABSTRACT

A transient voltage suppression circuit consists of energy dissipation components with one end connected either to a line or a neutral wire of a power line and the other end connected to a reed switch which, in turn, is connected to ground. The reed switch, which is an encapsulated switch consisting of two metal strips with a gap between them, is in an open position, and accordingly, does not under normal operating conditions provide a path to ground for the associated energy dissipation components. The energy dissipation components thus do not conduct. When a transient having a sufficiently high voltage occurs between the line or neutral wires and the ground wire, it causes the reed switch to conduct momentarily, that is, spark, across the gap. The switch momentarily forms a path to ground and allows the associated energy dissipation components to shunt a transient current away from protected appliances. The reed switch gap size is chosen such that the switch can withstand, without conducting, various high-voltage tests. The circuit can thus remain operative without affecting the testing of the protected appliances.

8 Claims, 2 Drawing Sheets

POWER LINE TRANSIENT SUPPRESSION CIRCUIT

This application is a continuation of application Ser. No. 07/716,420, filed Jun. 17, 1991, now abandoned.

FIELD OF INVENTION

The invention relates generally to voltage surge suppression circuits, and more particularly, to surge suppression circuits which can accommodate industrial high-voltage testing specifications.

BACKGROUND OF INVENTION

Power line voltage transients, that is, voltage spikes, caused by, for example, the switching of loads to or from a branch of a power distribution system, lightning and so forth, can damage electronic appliances or devices, such as computers, connected to the power line. Such transients, while typically of short duration, may subject components in the devices to voltages and currents above their maximum operating limits. These transient voltages and currents may cause components to malfunction or explode, prematurely age, or may destroy them altogether. To prevent the transient voltages and associated currents from reaching the components, transient suppression circuits, sometimes referred to as surge suppression circuits, are connected to the device at the input from the power line, that is, at a point between the protected components and the power line.

A household/office, or single-phase power line normally includes three conductors, or wires, referred to as "line" or "phase", "neutral" and "ground." Transients may occur between the line and neutral wires, the line and ground wires or the neutral and ground wires, and thus, transient suppression circuits which can handle all three types of transients are desirable. Transient suppression circuits typically short-circuit the transients between the line and neutral wires. Such transients are commonly referred to as normal mode transients. The circuits typically direct to ground the transients between the line and ground wires or the transients between neutral and ground wires. These transients are referred to collectively as common mode transients. Three-phase power lines, for devices such as industrial equipment which draw higher currents, have 5 wires, three wires which correspond to the line, or phase, wires and a neutral wire and a ground wire. Transient suppression circuits for these power lines operate in basically the same manner as the three wire circuits and direct transients between the various wires to ground, if they employ common-mode protection.

In either case the suppression circuits include in the current directing paths energy-dissipating components, such as current limiting resistors or metal-oxide-varistors (MOV's). During a transient, the transient current is directed through one or more of these components, which essentially dissipate some of the associated energy. The remaining transient energy, and thus current, is brought within a safe operating range.

U.S. Pat. No. 4,739,436 to Stefani et al., describes a voltage suppression circuit which uses MOV's connected between the various power line wires to direct transients to either the neutral wire or the ground wire, as appropriate. When power line voltages remain within a normal operating range the MOV's have a high impedance, and thus, they conduct essentially only leakage current. Accordingly, the power line current basically flows directly to the protected device. When a voltage transient between two power line wires occurs the voltage applied to the MOV's associated with the wires rises, which causes the MOV's to effectively lower their resistance. The transient current then flows through this low impedance path and is thus shunted away from the device components.

Known transient suppression circuits divert the currents associated with all voltage transients which are above a particular voltage level. The particular voltage level is the level that causes the MOV's to lower their impedances below those of the protected device components. The MOV's typically achieve such a lowered impedance at 320 volts AC RMS, or higher. However, this voltage level is below the levels required for certain high-voltage electrical safety tests required by, for example, United Laboratories (UL), for finished goods or appliances. Accordingly, the transient protection circuits with common-mode transient protection may interfere with the tests, if they are not removed or deactivated.

Specifically, each device must be tested by the manufacturer for, among other things, the effectiveness of its insulation. For example, the manufacturer must test the devices for conformance to UL 1950 (domestic) or IEC 950 (international) basic and supplementary insulation standards. These tests, called "dielectric withstand tests" and commonly referred to as the "hipot" tests, involve the shorting together of the line and neutral wires and the application of a relatively high voltage of approximately 1500 volts AC RMS between the ground and line wires. Components, such as filtering capacitors, connected between these wires may then conduct. If the wires are not properly insulated, or if the capacitors conduct a relatively large current, the device may be a safety hazard. A particular device which conducts current above predetermined, device-specific reactive and leakage current levels fail the test.

In known systems, the manufacturers either remove the power line transient suppression circuit from each device to be tested or de-activate the circuit before performing the hipot test. Otherwise, the suppression circuit provides a low resistance path for the current between the line and ground wires, and the device will necessarily appear to fail the test.

When the test is completed, the manufacturer must then re-insert or re-activate the suppression circuit. Either operation adds significant cost to the manufacturing process, which directly affects the product cost. What is needed is a voltage suppression circuit which can withstand the high voltages of the hipot test without conducting and still operate to suppress potentially harmful common mode voltage transients. Such a circuit may be in addition to or include circuitry which handles normal mode transients.

SUMMARY

A transient protection incorporating the invention essentially includes a pair of MOV's each having one end connected to the line or neutral wire and the other end connected to a reed switch which in turn is connected to ground. The reed switch is a vacuum sealed switch consisting of two metal strips, or reeds, with a gap between them. Accordingly, it does not, under normal operating conditions, provide a path to ground for the associated MOV's and the MOV's can not conduct.

When a common mode transient having a sufficiently high voltage occurs between the line or neutral wire and the ground wire, it causes the reed switch to conduct momentarily, that is, spark, across the gap. The switch thus briefly forms a path to ground and allows the associated MOV's to conduct the transient current away from the associated device components. The MOV's thus limit the amount of current which flows to these components.

While the reed switch conducts during a transient, it remains in the open position. Accordingly, the associated components of the transient suppression circuit conduct only in response to a common mode voltage transient which has a sufficiently high voltage. The hipot test voltages are approximately 1500 volts, and thus, a reed switch which has a minimum sparking voltage of, for example, 2500 volts, may be used. The tests do not cause the reed switch to conduct, and therefore, the switch does not allow the associated MOV's to conduct. Accordingly, the circuit can remain operative while the hipot test is being performed, without affecting the results of the hipot test.

DESCRIPTION OF THE DRAWINGS

The above and further advantages of the invention may be better understood by referring to the following description in conjunction with the accompanying drawings, in which.

DETAILED DESCRIPTION

Figure 1:
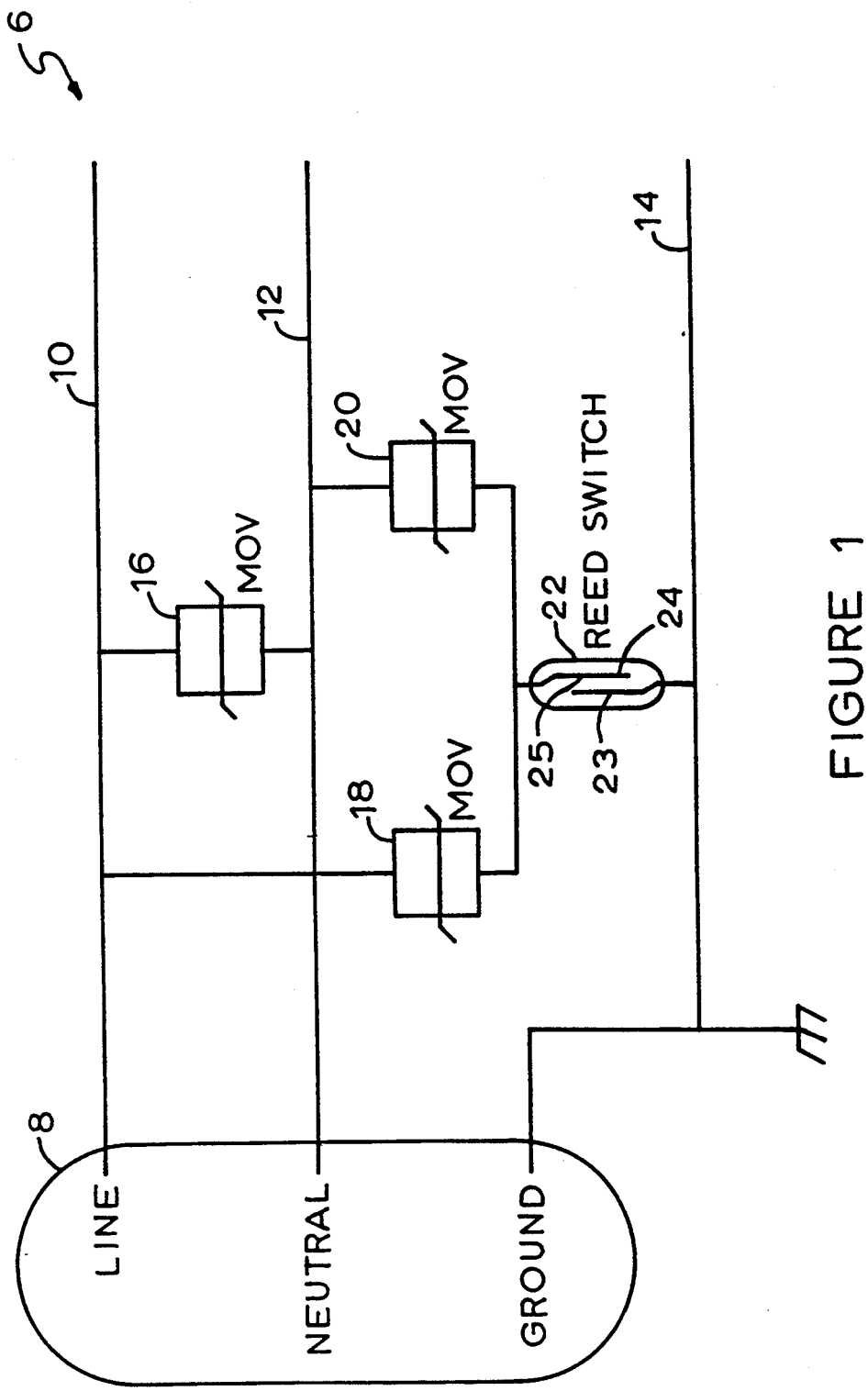
FIG. 1 is a circuit diagram of a transient suppression circuit designed for use with a 3-wire power line.

FIG. 1 depicts a transient suppression circuit 6 for use with a power line 8 which has three wires, namely, a line wire 10, a neutral wire 12 and a ground wire 14. The circuit handles both normal mode and common mode transients. An MOV 16 connects to both the line wire 10 and the neutral wire 12 to form a path for the normal mode transient current. MOV's 18 and 20 are connected, respectively, between the line wire 10 and the neutral wire 12 and a reed switch 22. The other terminal of the switch 22 is connected to ground. The MOV's 18 and 20 and the reed switch 22 form a path for the common-mode transient current.

The MOV's 16, 18 and 20 have high impedances when voltages within the normal operating range of the power line are applied to them. For example, when a normal mode voltage transient occurs between the line and neutral wires the MOV 16 responds by lowering its impedance, which allows the transient current to flow through it. The current is thus shunted from a protected device (not shown) attached to the wires. When a sufficiently large common mode voltage transient occurs between the line wire 10 and ground or the neutral wire 12 and ground, the reed switch 22 conducts, which allows MOV's 18 and 20 to shunt common-mode transient currents away from any attached device components to ground, as discussed in more detail below.

The reed switch 22 consists of two ferromagnetic reeds 23 and 24 separated by a gap 25. An evacuated glass capsule houses the reeds 23 and 24. When a sufficiently high voltage is applied to the reed switch 22, a spark occurs across the gap 25. A path to ground for the transient current is thus formed through reed switch 22 and either or both of the associated MOV's 18 and 20. If a voltage below the sparking potential is applied to the reed switch, no spark is formed and the switch does not conduct. Accordingly, the switch 22 does not form a path through the MOV's 18 and 20 for the current.

A reed switch is typically used in conjunction with a magnet. When a sufficiently strong magnetic field is applied to the switch, the field produces an attractive force between the reeds which brings them into contact and thus closes the switch. The transient suppression circuit 6 does not use a magnet to activate the reed switch 22. Instead, the switch 22 remains open and conducts only when a voltage applied to it is high enough to cause the switch to spark across the gap 25. Thus the switch 22 conducts across the gap 25 only in response to a power line transient. Being vacuum sealed, the switch performs in a consistent manner in response to an applied voltage.

Reed switches are typically rated by "pulling force," that is, in terms of magnetic field force required to close the gap. A person skilled in the art can readily associate pulling force, which is directly related to gap size, with the voltage required to produce a spark across the gap. Therefore, the skilled person can determine the pulling force for a switch which will spark above a predetermined voltage level.

If a testing voltage of 1500 volts is used in the hipot test discussed above, a reed switch designated as MARR-5 from Hamlin Inc., which has a pulling force of 27-38 ampere turns, may be used in a transient suppression circuit designed for use with a standard 3-wire power line. A circuit incorporating such a switch will not conduct, or spark, until it has applied to it a voltage of between 2000 and 3000 volts, with the minimum voltage required for sparking being determined by the characteristics of the particular reed switch selected for the circuit. This circuit, regardless of the exact voltage requirement, will not conduct during the hipot test. It will, however, conduct when potentially damaging higher-voltage transients are applied to it.

The circuit does not require a reed switch in the transient current path formed between the line wire 10 and the neutral wire 12 because these wires are shorted together during the hipot test. Accordingly, the circuit uses MOV 16 alone for normal mode transient protection.

The transient suppression circuit 6 may be designed to handle transients above any predetermined testing level by varying the size of the gap 25, that is, by selecting a reed switch with a higher or a lower pulling force rating. The switch may be designed, for example, to spark whenever the voltage applied to it goes above 1800 volts and still satisfy the requirement that it not spark during a hipot test. As discussed above, the hipot test produces common mode transients, and thus, the reed switch 22 is included in the common mode transient current path. Normal mode transient protection is included in the circuit as an added feature.

Figure 2:
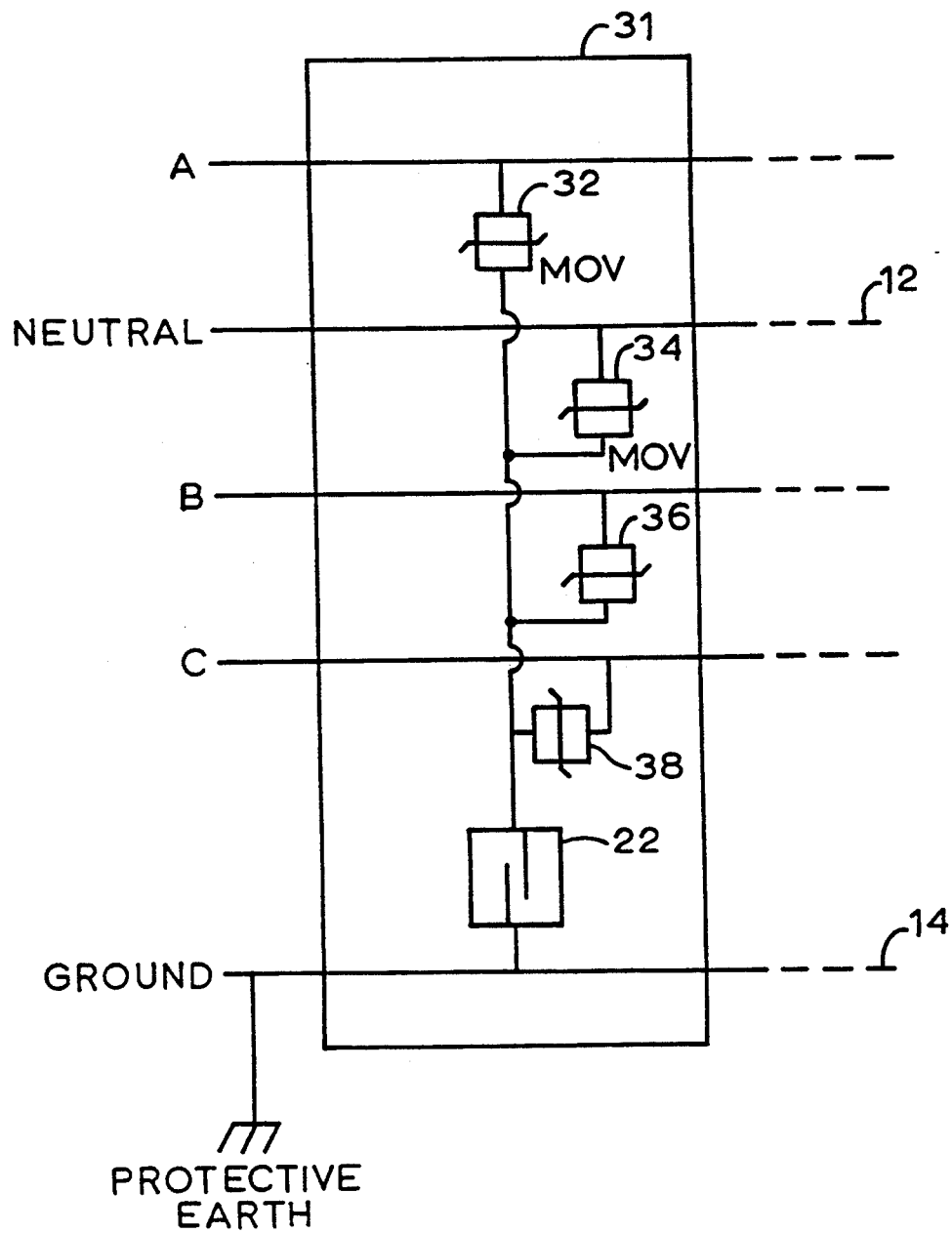
FIG. 2 is a circuit diagram of a transient suppression circuit designed for use with a 5-wire power line.

FIG. 2 depicts one module 31 of a transient suppression circuit 30 for use with a 5-wire, or 3-phase, power line. Such power lines carry currents which are larger than the current carrying limit of standard MOV's. Accordingly, several identical modules 31 are connected in parallel, and each module is subjected to a current which is within its limit.

The power line has three line, or phase, wires A, B, and C, a neutral wire 12 and a ground wire 14. A module 31 of transient suppression circuit 30 consists of MOV's 32, 36 and 38 connected, respectively, between the phase wires A, B and C and a first end of a reed switch 22, a fourth MOV 34 is also connected between the neutral wire 12 and the reed switch 22. The second end of reed switch 22 is connected to the ground wire 14 which, in turn, is connected to a protective earth ground. When a sufficiently high voltage transient occurs between any of the lines, the reed switch 22 in each module 31 momentarily conducts, and a path is formed for the transient current through the associated MOV 32, 34, 36 or 38 to ground.

The number of modules 31 connected, in parallel, in the transient suppression circuit depends in large part on the current limits of the MOV's 32-38. If MOV's with relatively small current limits are used, a relatively large number of modules 31 are required so that each module handles only a small amount of the transient current. If MOV's which handle large currents are used, fewer modules are required.

The modules 31 can be expanded for use with multiphase power lines by including in each module additional MOV's, one for each phase wire. For example, a module 31 for use with a 9-phase line includes nine MOV's connected between the phase wires and the reed switch and two MOV's connected, respectively, between the neutral and ground wires and the reed switch.

The foregoing description has been limited to two specific embodiments of this invention. It will be apparent, however, that variations and modifications may be made to the invention, with the attainment of some or all of its advantages. Therefore, it is the object of the appended claims to cover all such variations and modifications as come within the true spirit and scope of the invention.

I claim:

1. A transient suppression circuit for suppressing voltage transients over a power line, said circuit comprising:
    A. a plurality of energy dissipation components, each component having a first end and a second end, with the first ends of said components being connected to one of the line or neutral wires of the power line;
    B. conducting means having a first terminal and a second terminal with said first terminal connected to said second ends of said energy dissipation components and said second terminal connected to the ground wire, said conducting means including:
      i. two electrodes separated by a gap having a predetermined size, and
      ii. an evacuated enclosure which encapsulates said gap in a vacuum;
    said predetermined size of the gap:
      a. permitting conduction across the gap and current to flow through said energy dissipation components when a voltage applied to said power line is above but not less than a predetermined voltage level of 1500 AC volts RMS, and
      b. preventing conduction across the gap and current not to flow through said dissipation components when said voltage applied to said power line is not above said predetermined voltage level.

2. The transient suppression circuit of claim 1, wherein said energy dissipation component is a metal oxide varistor.

3. The transient suppression circuit of claim 1, wherein said circuit further includes additional energy dissipation components, said additional energy dissipation components being connected between a line wire and a neutral wire, said energy dissipation components having an impedance which prevents current from flowing through them when the voltage applied to them is less than a predetermined value.

4. A transient suppression circuit for suppressing voltage transients over a three-phase power line, said circuit including a plurality of modules connected to the power line in parallel and each module comprising:
    A. a plurality of energy dissipation components, each component having a first end and a second end, with the first ends of said components being connected to one of a neutral wire of the power line or any of three line wires of the power line;
    B. conducting means having a first end and a second end, with said first end connecting to said second ends of said energy dissipation components and said second end connecting to the ground wire, said conducting means including two electrodes said electrodes being separated by a gap having a predetermined size, said conducting means further including an evacuated tube which encapsulates said two electrodes;
    said conducting means in each module producing a voltage differential between the two electrodes when a voltage is applied to the power line, said conducting means conducting across the gap when the applied voltage has a magnitude above but not less than a predetermined voltage level of 1500 AC volts RMS, said conducting means conducting any current flowing through the energy dissipation components connected to said conducting means when said conducting means conducts across the gap and blocking any current when said conducting means does not conduct, each module conducting in parallel a current which is below a current limit of said energy dissipation components.

5. The transient suppression circuit of claim 4, wherein said energy dissipation components are metal oxide varistors.

6. A transient suppression circuit for suppressing voltage transients over a multi-phase power line, said circuit including a plurality of modules connected to the power line in parallel and each module comprising:
    A. a plurality of energy dissipation components, each component having a first end and a second end, with the first ends of said components being connected to one of a neutral or multiple line wires of the power line;
    B. a conducting means having a first end and a second end, with said first end connecting to said second ends of said energy dissipation components and said second end connecting to the ground wire, said conducting means including two electrodes separated by a gap having a predetermined size, said conducting means including an evacuated tube which encapsulates said two electrodes;
    said conducting means in each module producing a voltage differential between its two electrodes when a voltage is applied to the power line and conducting across the gap when the applied voltage signal has a magnitude above but not less than a predetermined voltage level of 1500 AC volts RMS, said conducting means conducting any current flowing through the energy dissipation components connected to said conducting means when said conducting means conducts across the gap and blocking any current when said conducting means does not conduct, each module conducting in parallel a current which is below a current limit of said energy dissipation components.

7. The transient suppression circuit of claim 6, wherein said energy dissipation components are metal oxide varistors.

8. A transient suppression circuit for suppressing voltage transients over a power line, said circuit comprising:
- A. a plurality of energy dissipation components, each component having a first end and a second end, with the first ends of said components being connected to one of a neutral wire or any of a plurality of line wires of the power line;
- B. conducting means having a first terminal and a second terminal with said first terminal connected to said second ends of said energy dissipation components and said second terminal connected to the ground wire, said conducting means including:
  i. two electrodes separated by a gap having a predetermined size, and
  ii. an evacuated enclosure which encapsulates said gap in a vacuum;

said predetermined size of the gap:
- a. permitting conduction across the gap and current to flow through said energy dissipation components when a voltage applied to said power line is above but not less than a predetermined voltage level of 1500 AC volts RMS, and
- b. preventing conduction across the gap and current not to flow through said dissipation components when said voltage applied to said power line is not above said predetermined voltage level.

* * * * *